United States Patent
Juventin et al.

(10) Patent No.: US 10,068,714 B2
(45) Date of Patent: Sep. 4, 2018

(54) ENERGY STORAGE MODULE COMPRISING A PLURALITY OF ENERGY STORAGE ASSEMBLIES

(71) Applicant: BLUE SOLUTIONS, Ergue Gaberic (FR)

(72) Inventors: Anne-Claire Juventin, Quimper (FR); Laurent Le Gall, Ergue Gaberic (FR)

(73) Assignee: BLUE SOLUTIONS, Ergue Gaberic (FR)

( * ) Notice: Subject to any disclaimer, the term of this patent is extended or adjusted under 35 U.S.C. 154(b) by 0 days.

(21) Appl. No.: 14/908,063

(22) PCT Filed: Jul. 28, 2014

(86) PCT No.: PCT/EP2014/066125
§ 371 (c)(1),
(2) Date: Jan. 27, 2016

(87) PCT Pub. No.: WO2015/014769
PCT Pub. Date: Feb. 5, 2015

(65) Prior Publication Data
US 2016/0172121 A1    Jun. 16, 2016

(30) Foreign Application Priority Data
Jul. 30, 2013 (FR) .................................. 13 57504

(51) Int. Cl.
*H01G 11/10* (2013.01)
*H01G 4/38* (2006.01)
(Continued)

(52) U.S. Cl.
CPC ............... *H01G 11/10* (2013.01); *H01G 2/02* (2013.01); *H01G 2/08* (2013.01); *H01G 4/38* (2013.01);
(Continued)

(58) Field of Classification Search
CPC ......... H01G 11/84; H01G 11/04; H01M 2/12; H01M 10/50; H01M 10/617
See application file for complete search history.

(56) References Cited

U.S. PATENT DOCUMENTS

| 5,765,389 A | * | 6/1998 | Salyer | .................... | C09K 5/063 62/434 |
| 2007/0046259 A1 | | 3/2007 | Shimizu | | |

(Continued)

FOREIGN PATENT DOCUMENTS

| DE | 102008059972 | 6/2010 |
| DE | 102011009768 | 8/2012 |

(Continued)

OTHER PUBLICATIONS

French Search Report, dated May 15, 2014, French Application No. 1357504.

(Continued)

*Primary Examiner* — Nguyen Ha
(74) *Attorney, Agent, or Firm* — Womble Bond Dickinson (US) LLP

(57) ABSTRACT

An energy storage module (10) including a plurality of energy storage assemblies (12) electrically connected to one another, the module including an external casing (40) in which are arranged the storage assemblies (12) and at least one heat exchanger (24). The energy storage assemblies (12) are arranged side by side on at least two distinct levels (N1, N2). The heat exchangers (24) are positioned between two adjacent levels. The exchangers (24) are fixed to the casing (40) of the module at least at a securing wall (28) that is distinct from the contact faces (26A, 26B). The securing walls and the casing are configured so that the module has a space between the corresponding securing walls (28; 44) of the exchanger and of the casing.

16 Claims, 2 Drawing Sheets

(51) Int. Cl.
*H01G 9/00* (2006.01)
*H01G 9/08* (2006.01)
*H01G 9/26* (2006.01)
*H01G 11/18* (2013.01)
*H01G 11/82* (2013.01)
*H01G 2/02* (2006.01)
*H01G 2/08* (2006.01)
*H01G 11/84* (2013.01)
*H01G 17/00* (2006.01)
*H01M 10/613* (2014.01)
*H01M 10/6557* (2014.01)

(52) U.S. Cl.
CPC ............ *H01G 9/0003* (2013.01); *H01G 9/08* (2013.01); *H01G 9/26* (2013.01); *H01G 11/18* (2013.01); *H01G 11/82* (2013.01); *H01G 11/84* (2013.01); *H01G 17/00* (2013.01); *H01M 10/613* (2015.04); *H01M 10/6557* (2015.04); *Y02E 60/13* (2013.01)

(56) References Cited

U.S. PATENT DOCUMENTS

| | | | | |
|---|---|---|---|---|
| 2008/0265586 A1* | 10/2008 | Like | ................ | B60R 16/04 290/38 R |
| 2012/0052358 A1* | 3/2012 | Tan | ................ | H01M 2/1077 429/120 |
| 2012/0087060 A1 | 4/2012 | Ra et al. | | |
| 2012/0214041 A1* | 8/2012 | Harada | ............ | H01M 10/6563 429/120 |
| 2013/0157089 A1 | 6/2013 | Miyatake et al. | | |

FOREIGN PATENT DOCUMENTS

| | | |
|---|---|---|
| EP | 2608309 | 6/2013 |
| WO | WO-2012121099 | 9/2012 |
| WO | WO-2013037742 | 3/2013 |

OTHER PUBLICATIONS

International Search Report with English Language Translation, dated Oct. 21, 2014, Application No. PCT/EP2014/066125.
International Written Opinion received for PCT Patent Application No. PCT/EP2014/066125, dated Oct. 21, 2014, 10 pages (5 pages of English Translation and 5 pages of Original Document).
International Preliminary Report on Patentability received for PCT Patent Application No. PCT/EP2014/066125, dated Feb. 11, 2016, 13 pages (7 pages of English Translation and 6 pages of Original Document).

* cited by examiner

ENERGY STORAGE MODULE COMPRISING A PLURALITY OF ENERGY STORAGE ASSEMBLIES

BACKGROUND OF THE INVENTION

Field of the Invention

The invention relates to an energy storage module, comprising a plurality of energy storage assemblies.

Description of Related Art

Within the scope of the present invention, an "electrical energy storage assembly" means either a capacitor (i.e. a passive system comprising two electrodes and an insulator), a supercapacitor (i.e. a system comprising at least two electrodes, an electrolyte and at least one separator), or a battery especially a lithium battery-type (i.e. a system comprising at least one anode, at least one cathode and an electrolyte between the anode and the cathode). However, the present invention more particularly relates to a module of supercapacitors.

Such a module releases significant heat due to the internal resistor of the energy storage assemblies which produce energy losses by the Joule effect. In order to prevent the module from being damaged due to an overtemperature of the assemblies, the energy storage modules are fitted with means for discharging the heat. For that purpose, modules can be associated with heat exchangers, for example fins to increase the heat exchange surface with air or an element enabling a fluid to pass in proximity to the assemblies, in order to discharge the heat through this fluid.

These heat exchangers are generally positioned outside the module, near a heat discharge face of the module which is made as thermally conducting as possible.

However, in large capacity modules, comprising a great number of energy storage assemblies, it has been noted that such an association of the module with a heat exchanger was not always enough.

SUMMARY OF THE INVENTION

The object of the invention is thus to develop an energy storage module enabling an optimum discharge of heat and this whatever the size and the total capacity of the module.

For that purpose, the object of the invention is an energy storage module comprising a plurality of energy storage assemblies electrically connected to one another, the module comprising an external casing in which are arranged the storage assemblies and at least one heat exchanger, wherein:
  the energy storage assemblies are disposed side by side on at least two distinct levels, the or at least one of the heat exchangers being positioned between two adjacent levels so as to be in thermal contact with at least one storage assembly of each of the two adjacent levels on two opposite respective contact faces of the exchanger,
  said or at least one of said exchangers is fixed to the casing of the module at least at a securing wall that is distinct from the contact faces, the securing walls of the exchanger and of the casing being configured in such a way that the module has a space between the corresponding securing walls of the exchanger and of the casing, at least at a location distinct from a securing site.

Thus, according to the invention, the heat exchanger is positioned directly inside the casing of the module and not outside the module, by being in contact with the casing of the module. This enables a better thermal discharge of the heat produced by the storage assemblies since the exchanger is more directly in contact with the assemblies than in prior art, the casing of the module being not interposed between the assemblies and the exchanger.

Furthermore, the exchanger being positioned in the middle of the module comprises two opposite heat exchanger faces, each enabling the heat produced by the storage assemblies of two distinct adjacent levels to be discharged. There again, the thermal discharge efficiency of the module is increased without however significantly increasing the overall dimensions of the module, since only one heat exchanger is added in the module. The overall dimensions are also improved relative to those of two smaller size adjacent modules associated with a same heat exchanger, since no casing is interposed between the exchanger and each level of storage assemblies.

Moreover, even if securing the exchanger to the casing, necessary for the proper mechanical strength of the module, is likely to disrupt the operation of the exchanger since the heat coming from the outside of the module is transmitted to the exchanger through the casing, a particular architecture of the exchanger enables this factor to be made unimportant. Such disruptions would indeed be likely to create inhomogeneities in cooling the assemblies, which would have consequences regarding their ageing and would therefore decrease the service life of the module. The inventors have found that providing a space between the heat exchanger and the external casing was sufficient enough, which by interposing an air knife between the exchanger and the casing enables these elements to be insulated from one another and a disruption of the operation of the exchanger to be avoided.

The invention thus enables a large capacity module to be developed, in which the heat is homogeneously discharged in large quantities, and which has limited overall dimensions.

The module according to the invention can further comprise one or more features of the following list:
  the exchanger is configured in such a way that the or at least one of the securing sites, especially each of them, of the exchanger is protruding from the remainder of the securing wall. The space is thus obtained between the securing walls of the casing and of the exchanger by adapting the configuration of the exchanger, which avoids making the outside shape of the module too complex. However, it would be absolutely possible to obtain a module according to the invention by changing the configuration of the casing, especially by providing at least the internal face of the latter with hollows,
  the heat exchanger comprises at least one duct into which a fluid, for example water, is intended to travel. The exchanger can then comprise a fluid inlet and outlet, the casing comprising at least one hole to enable the passage of fluid from the outside. The exchanger especially comprises protruding connectors forming a fluid inlet and outlet, these connectors being configured to pass through the corresponding hole of the casing. A seal is especially interposed between the casing and the protruding connectors, the seal being preferably overmoulded on the casing. This exchanger configuration is particularly suited since the casing has a relatively closed configuration in spite of the fluid delivery in the module, which avoids endangering the electrical insulation of the module,
  the heat exchanger is intended to be in thermal contact with all the storage assemblies of both adjacent levels.

This indeed enables a maximum quantity of heat to be discharged using a single piece and therefore the design of the module to be optimized, the heat exchanger comprises two opposite contact faces and at least one side wall extending between the opposite contact faces, preferably substantially perpendicular to the contact faces, the securing sites being distributed on the or at least one of the side walls so that it/they form(s) the securing wall(s). The heat exchanger connected to all the side walls of the casing, throughout its circumference, can then be preferably obtained, which provides a proper mechanical strength of the module, and this whatever its position in operation (even in the case where the exchanger extends substantially vertically), the heat exchanger is secured to the casing of the module by screwing, for that purpose, the securing sites of the exchanger comprising securing holes, intended to be positioned facing securing holes of the casing of the module. This securing mode is indeed simple and inexpensive, the space comprised between the securing walls of the exchanger and of the casing is sized in such a way that the distance between the corresponding securing walls of the casing and of the exchanger is lower than 3 mm. This enables the surface of the contact faces of the exchanger to be maximized, the surface of the portions of the securing wall(s) of the exchanger in contact with the casing is lower than 20%, especially 10%, of the total surface of the or said securing wall(s). Preferably, one of the protrusions or the protrusions in which the securing sites are provided have a dimension lower than 30 mm in at least one direction, preferably two substantially normal directions, of the securing wall(s), which makes it possible to minimize the surface of the exchanger in contact with the casing as well as the operation disruptions of the exchanger due to the heat exchanges with the outside through the walls of the casing, the energy storage assemblies substantially extend along a longitudinal direction and have in particular a cylindrical shape. They are superimposed with one of the contact faces of the exchanger at one the end faces thereof along the longitudinal direction, the module comprises at least one strip superimposed to the end faces of two adjacent storage assemblies in order to electrically connect said assemblies, at least one electrical insulation member, such as a mat made of elastomer, in particular EPDM, is interposed between the assemblies and the exchanger, preferably between the strips and the exchanger, the energy storage assemblies are supercapacitors, the module can also comprise more than two levels, a heat exchanger being preferably interposed between each pair of adjacent levels of the module, each assembly of the module is electrically connected to at least one other assembly of the module. All the assemblies can be electrically connected to one another (for example in series) or the assemblies can form independent groups of assemblies electrically connected to one another. The assemblies of a same level can in particular be all electrically connected to one another, in particular in series.

The object of the invention is also a method for assembling an energy storage module comprising a plurality of storage assemblies and at least one heat exchanger, the method comprising the following steps:

forming first and second groups of energy storage assemblies arranged side by side, which are preferably connected to one another, in particular though connection strips, positioning the heat exchanger(s), comprising at least two opposite contact faces, between both groups of assemblies, in such a way that each contact face is respectively in thermal contact with at least one storage assembly of one of the groups, arranging an external casing in such a way that it surrounds the groups of assemblies and the heat exchanger and securing the exchanger to at least one wall of the casing at least at one of its walls that is distinct from the contact faces, the exchanger and the casing being configured in such a way that the module has a space between the corresponding securing walls of the exchanger and of the casing, at least at a location distinct from a securing site.

BRIEF DESCRIPTION OF THE DRAWINGS

A module according to the invention will now be described using drawings describing a particular non-limiting exemplary embodiment of the invention, in which.

DETAILED DESCRIPTION OF THE INVENTION

Figure 1:
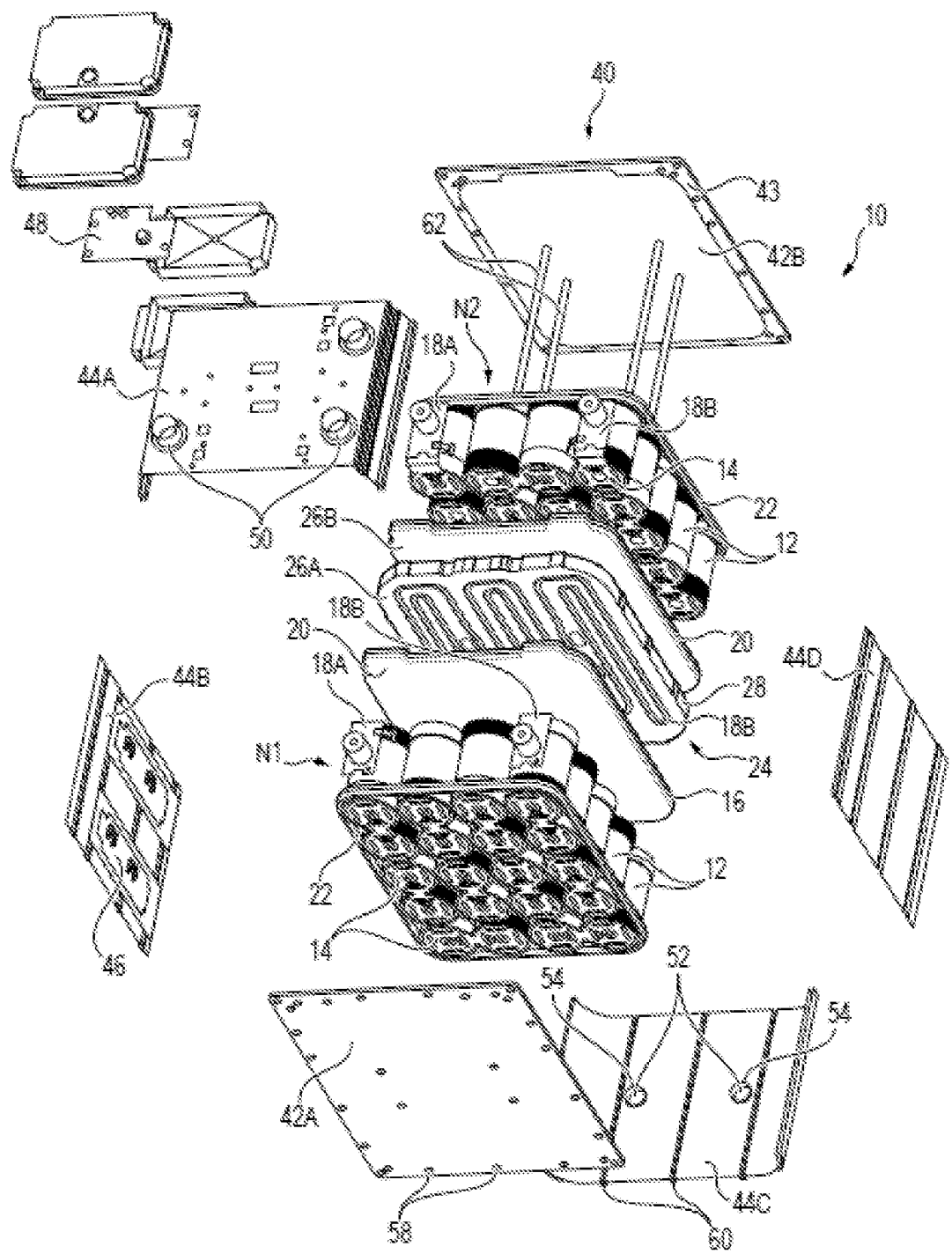
FIG. 1 is an exploded view of a module according to a particular embodiment of the invention.

FIG. 1 shows an exploded view of a module 10 according to a particular embodiment of the invention. As can be seen, this module comprises a plurality of energy storage assemblies 12 arranged on two distinct levels N1 and N2.

Each assembly 12 has a generally cylindrical shape and comprises a housing fitted with a body comprising a side wall extending along the longitudinal axis of the assembly, closed by an end wall at one of the ends of the side wall and opened at its opposite end. A lid covers the body at its open end. The housing therefore comprises a second end wall at the longitudinal end of the side wall. The housing contains a coiled energy storage element comprising a winding of two superimposed electrodes with an interposed separator. An electrolyte has also been introduced in the housing for impregnating the electrodes. Each electrode of the winding is electrically connected to an end face of the assembly, each of the end faces forming a terminal of the assembly.

The architecture of the assemblies will not be further described since it is not the focus of the invention. Actually, the reader will note that the architecture of each of the assemblies can be very different from what has been described. This assembly can for example comprise a tubular body closed at each of its ends by a lid or have a shape other than a cylindrical shape.

Each level N1, N2 thus comprises a plurality of identical assemblies 12, arranged in such a way that their longitudinal axes are substantially parallel. They are electrically connected in series through conducting strips 14. For that purpose, each assembly comprises a strip 14 arranged on one of its end faces and electrically connecting it to a first adjacent assembly and another strip 14 arranged on the other of its end faces and connecting it to another adjacent assembly. The assemblies are in contact with each other and are electrically insulated at their terminals which have not a same potential (the terminals not connected by the strips) through insulating sleeves 16 fitted on each of the assemblies. Strips therefore extend in each longitudinal end plane of the group of assemblies forming a level N1, N2. All the assemblies of a same level are electrically connected in series. They are also connected to the outside through output terminals 18A, 18B each connected to the terminal of the assembly, the potential of which is respectively the highest or the lowest.

There again, the structure of a group of assemblies forming one of the levels N1, N2 of the module according to the particular embodiment herein described has been quickly described but this group of assemblies could be configured in a different way. The strips could all extend in a same end plane of the group of assemblies. The assemblies of a same level could also not be all electrically connected to one another. The assemblies of both levels could also be connected to each other. Two adjacent assemblies could also not be in contact with each other at their side wall.

In order to insulate the assemblies 12 of each level N1, N2 from the surrounding elements, an insulation member is positioned at each longitudinal end plane of each level N1, N2. At one of the end planes, intended to be on the inner side of the module, a mat 20 made of a thermally conducting and electrically insulating material which covers the end faces of the assemblies has in particular been positioned. At the other end plan of each level, an annular ring 22 surrounding all the assemblies 12 has been positioned. The mat 20 and the annular ring 22 are for example made of elastomer, in particular of EPDM (ethylene-propylene-diene monomer).

Of course, the electrical insulation can be made differently from what has been described herein. A thermal mat 20 can in particular be positioned at each end plane of each level N1, N2 of the module. Insulation can also be carried out using elements attached to the casing of the module or other elements of the latter such as the heat exchanger.

As can also be seen in FIG. 1, the module comprises a heat exchanger 24 situated in the module, between both levels N1, N2 of assemblies 12. This exchanger comprises two opposite contact faces 26A, 26B each intended to discharge the heat respectively coming from the levels N1, N2 of the module. For that purpose, each of the faces 26A, 26B is in contact with the mats 20 arranged on the groups of assemblies 12 of each of the levels N1, N2 and in thermal contact with the assemblies. The heat exchanger also comprises a peripheral side wall 28 connecting both contact faces to each other and delimiting a substantially closed space between these faces 26A, 26B, inside which meanders a duct 30 (shown by transparency in FIG. 3) intended to convey a heat transfer fluid through which the heat is discharged, such as water. To supply the duct with fluid, the exchanger 24 comprises a fluid inlet 32 and outlet 34, each formed by a connector and provided on the peripheral side wall. The exchanger will later be further described. The exchanger is sized to be superimposed on all the assemblies, the contact face then being in thermal contact with all the assemblies of each of the levels.

The module also comprises a casing 40 intended to surround the assemblies 12 of the levels N1 and N2 and the heat exchanger. This casing 40 has a parallelepiped shape and comprises six walls independent from one another.

The module especially comprises upper and lower walls 42A, 42B in contact with the end faces of the assemblies 12, at the so-called outside end planes, that is opposite the plane in thermal contact with the exchanger, of each of the levels N1, N2. Each of these walls comprises on its inner face, facing the inside of the module, a foam 43 enabling the electrical insulation of the module to be optimized, in addition to the ring 22.

The casing also comprises four side walls 44A-44D surrounding the side walls of the assemblies 12 as well as the one 28 of the heat exchanger. These walls form interfaces of the module with the outside and are also intended to carry operational elements of the module. For example, as can be seen in FIG. 1, the wall 44B carries the electronic boards 46 enabling the balancing of the electrically connected storage assemblies 12 of a same level to be managed. The wall 44*a* also comprises electronic elements 44 on its outer face, enclosed in a housing. The wall 44A further comprises holes 50 enabling the output terminals 18A, 18B to go through outside the module. The wall 44C also comprises holes 52 enabling the connectors 32, 34 of the heat exchanger to go through to the outside. In order to provide sealing, it will be noted that a seal 54 is positioned in proximity to each hole 52 in order to be interposed between the connector 32, 34 and the corresponding hole of the wall 44C. This seal can be added or overmoulded on the casing. It will be noted that a foam tongue can also be wound around the side walls of the assemblies 12 to optimize their electrical insulation.

The walls 42, 44 are connected to one another using screw securing means. For that purpose, the walls 42 comprise securing holes 58 and the walls 44 have facing channels 60 into which screws are intended to be screwed in. The channels 60 extend protruding from the wall 44 on its outer face. The inner face of the walls 44 is on the contrary substantially planar.

The module according to the invention also comprises stiffeners 62 providing a proper mechanical strength for the casing, said stiffeners being connected to both opposite walls 42A, 42B, passing between the assemblies of both levels N1, N2 and into holes 64 provided to that end of the heat exchanger.

The configuration of the casing also is not limited to what has been presented in the embodiment herein described. The walls of the casing could be in one piece. Moreover, the operational elements could be present on other walls than presented here. The stiffeners are also optional or could be implemented in another form.

Figure 2:
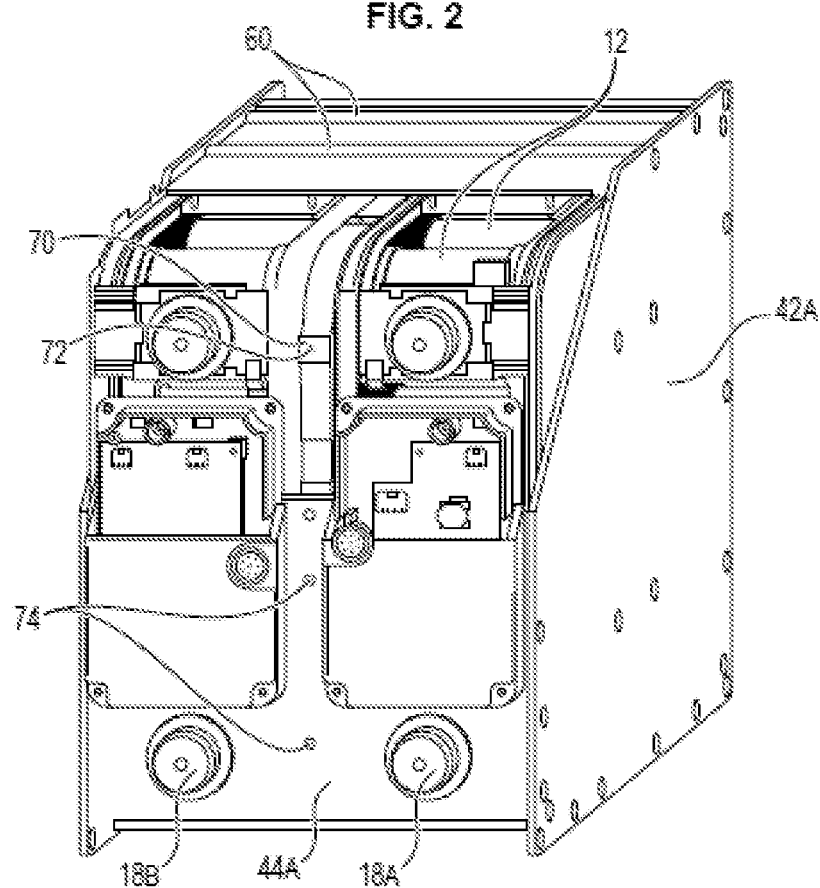
FIG. 2 is a cutaway perspective view of the module once assembled.

A configuration of the heat exchanger 24 and its cooperation with the casing 40 will now be further described. As indicated, this exchanger is situated inside the module and, to provide a proper mechanical strength of the module, it is secured to the walls 44 of the casing by screws. For that purpose, the exchanger 24 comprises a plurality of securing site 70 on its side wall. These securing sites 70 are distributed on the circumference of the exchanger, in such a way that the latter is connected to all the walls 44 of the casing. Its dimensions are therefore substantially complementary to those of the casing. Each of the securing sites 70 comprises a securing hole 72 into which is intended to be inserted a securing screw also inserted into a facing hole 74 of the wall 44 of the casing, as can be better seen in FIG. 2.

Figure 3:
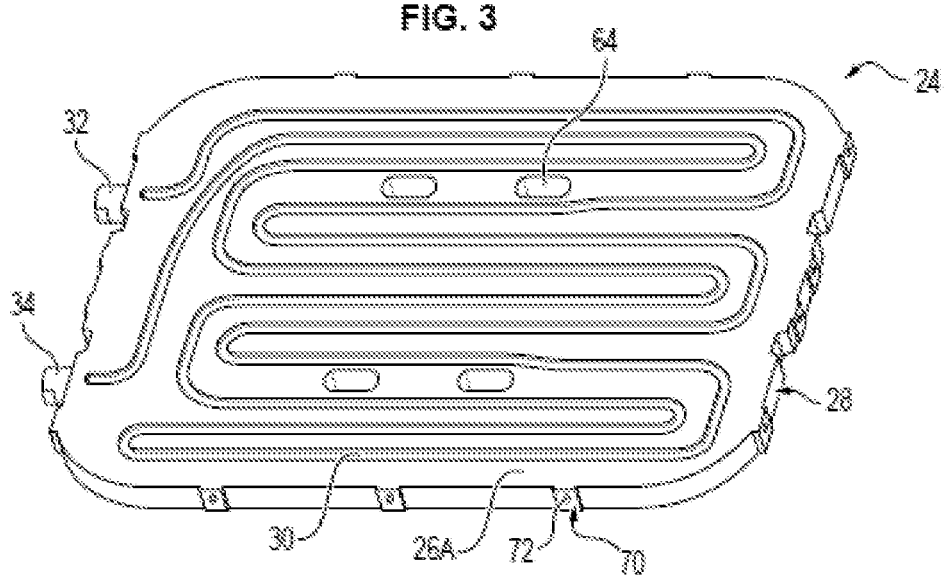
FIG. 3 is a perspective view of the heat exchanger of the module of FIG. 1.

As can be seen in FIG. 3, each securing site 70 is protruding from the remainder of the side wall, in such a way that only the securing sites are in contact with the wall 44 of the casing. The securing sites are thus protruding of about 1 mm relative to the remainder of the side wall 28. Thus, a space remains between the exchanger and the casing (the inner face of the walls 44 of the casing being planar) providing the insulation of the exchanger relative to the casing through an air knife. This avoids a disruption of the operation of the exchanger by the heat travelling in the walls of the casing (coming from the assemblies or from the outside). These securing sites are sized in such a way that the protrusion is the smallest possible in order to minimize the surface of the side wall of the exchanger in contact with the casing. Its dimensions do not exceed in particular 30 mm along two perpendicular directions, herein comprising in particular the direction normal to the contact faces and 20% of the total surface of the side wall 28 of the exchanger. A proper operation of the heat exchanger is provided this way, in spite of its positioning inside the module.

The shape of the heat exchanger 24 is not also limited to what has been described. One could for example devise that the casing is configured to comprise recesses at its inner face whereas the side wall 28 of the exchanger is planar. The configuration of the side wall 28 can also be different even when the shape of the walls 44 does not vary, as long as it has securing areas protruding from the remainder of the wall.

The method for manufacturing the module according to the invention will now be described. First, groups of assemblies 12 intended to form the levels N1 and N2 are formed and are electrically connected in series to one another, using the strips 14. The electrical insulation elements 20, 22 are then positioned on the end faces of the groups of the levels N1 and N2. The assemblies are then each placed side by side on an opposite contact face 26A, 26B of the heat exchanger 24. The operational elements (electronic board 46, 48, seals, etc.) are also positioned on the different walls 44 of the casing, then these thus fitted walls of the casing 40 are placed around both levels of assemblies and of the exchanger, possibly with interposed foam. Then, the wiring of the assemblies is connected to the electronic boards, the terminals 18A, 18B and the inlet 32 and outlet 34 connectors of the exchanger 24 are placed in the corresponding holes 50, 52 of the casing and then the different walls 42, 44 of the casing as well as the side walls 44 of the casing with the side wall 28 of the exchanger 24 are connected by screws.

This way, the invention provides a module which ensures in a most satisfactory way the discharging of heat produced by the assemblies contained in the module and this, in spite of limited overall dimensions.

Of course, the module and the manufacturing method according to the invention can have many alternatives relative to the embodiment of the figures. The above-described alternatives can also be applied. The module can also comprise an exchanger which does not cover all the surface of the assemblies or is in thermal contact only with part of the assemblies. The module can also comprise a plurality of exchangers between two levels. The module can also comprise more than two levels and an exchanger between each pair of adjacent levels or between certain pairs of levels.

The invention claimed is:

1. An energy storage module (10) comprising a plurality of energy storage assemblies (12) electrically connected to one another, the module comprising an external casing (40) in which are arranged the storage assemblies (12) and at least one heat exchanger (24), the module being characterized in that:
the energy storage assemblies (12) are disposed side by side on at least two distinct levels (N1, N2), the at least one heat exchanger (24) being positioned between two adjacent levels so as to be in thermal contact with at least one storage assembly of each of the two adjacent levels on two opposite respective contact faces (26A, 26B) of the heat exchanger,
said at least one heat exchanger (24) is fixed to the external casing (40) of the module at least at a securing wall (28) that is distinct from the contact faces (26A, 26B), the securing walls of the heat exchanger being configured in such a way that the module has a space between the corresponding securing walls (28; 44) of the heat exchanger and said external casing, at least at a location distinct from a securing site (70), and
wherein the heat exchanger comprises connectors (32, 34) forming a fluid inlet and outlet, these connectors being configured to pass through a corresponding hole (52) of the external casing (40), a seal (54) being interposed between the external casing and the connectors.

2. The module according to claim 1, wherein the heat exchanger (24) is configured in such a way that each securing site (70) of the heat exchanger is protruding from the remainder of the securing wall (28).

3. The module according to claim 1, wherein the heat exchanger (24) comprises at least one duct (30) into which a fluid is intended to travel.

4. The module according to claim 3, wherein the heat exchanger (24) comprises a fluid inlet (32) and outlet (34), said external casing comprising at least one hole (52) to enable the passage of fluid from the outside.

5. The module according to claim 1, wherein the connectors (32, 34) are protruding connectors forming a fluid inlet and outlet, these connectors being configured to pass through the corresponding hole (52) of the external casing (40), a seal (54) being interposed between the external casing and the protruding connectors.

6. The module according to claim 1, wherein the heat exchanger (24) is in thermal contact with all the storage assemblies (12) of both adjacent levels (N1, N2).

7. The module according to claim 1, wherein the heat exchanger (24) comprises two opposite contact faces (26A, 26B) and at least one side wall (28) extending between the opposite contact faces, substantially perpendicular to the contact faces, the securing sites (70) being distributed on the or at least one of the side walls in such a way that the latter form the securing wall(s).

8. The module according to claim 1, wherein the heat exchanger (24) is secured to the external casing (40) of the module by screwing, for that purpose, the securing sites (70) of the heat exchanger (24) comprising securing holes (72), intended to be positioned facing the securing holes (74) of the external casing.

9. The module according to claim 1, wherein the space situated between the securing walls (28; 44) is sized in such a way that the distance between the corresponding securing walls of said external casing and of the heat exchanger is lower than 3 mm.

10. The module according to claim 9, wherein the surface of the securing wall(s) (28) of the heat exchanger in contact with the external casing (40) is lower than 20%, especially 10%, of the whole surface of the securing wall(s) (28).

11. The module according to claim 1, wherein the energy storage assemblies (12) extend in a longitudinal direction, and are superimposed with one of the contact faces (26A, 26B) of the heat exchanger at one of their end faces along the longitudinal direction.

12. The module according to claim 11, wherein the module comprises at least one strip (14) superimposed on the end faces of two adjacent storage assemblies (12) in order to electrically connect said assemblies.

13. The module according to claim 1, wherein at least one electrical isolation member, such as a mat (20) made of elastomer, is interposed between the storage assemblies (12) and the heat exchanger (24).

14. The module according to claim 1, wherein the energy storage assemblies (12) are supercapacitors.

15. A method for assembling an energy storage module (10) comprising a plurality of storage assemblies (12) and at least one heat exchanger (24), comprising the following steps:
- forming first and second groups of energy storage assemblies arranged side by side,
- positioning at least one heat exchanger (24), comprising at least two opposite contact faces (26A, 26B), between both groups of the assemblies, in such a way that each contact face is respectively in thermal contact with at least one storage assembly (12) of one of the groups,
- arranging an external casing (40) in such a way that it surrounds the groups of assemblies and the heat exchanger and securing the heat exchanger to at least one wall (44) of the external casing at least at one of its walls (28) that is distinct from the contact faces (26A, 26B), the heat exchanger being configured in such a way that the module has a space between the corresponding securing walls (28; 44) of the heat exchanger and the external casing, at least at a location distinct from a securing site (70),
- wherein the heat exchanger comprises connectors (32, 34) forming a fluid inlet and outlet, these connectors being configured to pass through a corresponding hole (52) of the external casing (40), a seal (54) being interposed between the external casing and the connectors.

16. An energy storage module (10) comprising a plurality of energy storage assemblies (12) electrically connected to one another, the module comprising an external casing (40) in which are arranged the storage assemblies (12) and at least one heat exchanger (24), the module being characterized in that:
- the energy storage assemblies (12) are disposed side by side on at least two distinct levels (N1, N2), the at least one heat exchanger (24) being positioned between two adjacent levels so as to be in thermal contact with at least one storage assembly of each of the two adjacent levels on two opposite respective contact faces (26A, 26B) of the heat exchanger,
- said at least one heat exchanger (24) is fixed to the external casing (40) of the module at least at a securing wall (28) that is distinct from the contact faces (26A, 26B), the securing walls of the heat exchanger being configured in such a way that the module has a space between the corresponding securing walls (28; 44) of the heat exchanger and of the external casing, at least at a location distinct from a securing site (70), and
- wherein the surface of the securing wall(s) (28) of the heat exchanger in contact with the external casing (40) is lower than 20% of the whole surface of the securing wall(s) (28).

* * * * *